(12) United States Patent
Bunse

(10) Patent No.: US 12,739,918 B2
(45) Date of Patent: Sep. 15, 2026

(54) DETERMINE ACTION TO TAKE IN RESPONSE TO RADIO LINK FAILURE IN A NETWORK OF IAB NODES

(71) Applicant: Nokia Solutions and Networks Oy, Espoo (FI)

(72) Inventor: Stephan Bunse, Ulm (DE)

(73) Assignee: Nokia Solutions and Networks, Espoo (FI)

( * ) Notice: Subject to any disclaimer, the term of this patent is extended or adjusted under 35 U.S.C. 154(b) by 300 days.

(21) Appl. No.: 18/577,466

(22) PCT Filed: Jul. 26, 2022

(86) PCT No.: PCT/US2022/038331
§ 371 (c)(1),
(2) Date: Jan. 8, 2024

(87) PCT Pub. No.: WO2023/009515
PCT Pub. Date: Feb. 2, 2023

(65) Prior Publication Data

US 2024/0179778 A1 May 30, 2024

(30) Foreign Application Priority Data

Jul. 27, 2021 (FI) ..................................... 20215821

(51) Int. Cl.
*H04W 4/00* (2018.01)
*H04W 76/18* (2018.01)
(Continued)

(52) U.S. Cl.
CPC ........... *H04W 76/18* (2018.02); *H04W 76/19* (2018.02); *H04W 88/08* (2013.01)

(58) Field of Classification Search
CPC ...... H04W 76/18; H04W 76/19; H04W 88/08
See application file for complete search history.

(56) References Cited

U.S. PATENT DOCUMENTS 12,047,865 B2 * 7/2024 Liu ..................... H04W 36/305
2021/0195675 A1 * 6/2021 Park ...................... H04W 88/14
(Continued)

FOREIGN PATENT DOCUMENTS

EP 3860183 A1 8/2021
GB 2586261 A 2/2021
(Continued)

OTHER PUBLICATIONS

"3rd Generation Partnership Project; Technical Specification Group Radio Access Network; NG-RAN; Architecture description (Release 17)", 3GPP TS 38.401, V17.0.0, Apr. 2022, pp. 1-115.
(Continued)

*Primary Examiner* — Abdelnabi O Musa
(74) *Attorney, Agent, or Firm* — Lippes Mathias LLP

(57) ABSTRACT

There is provided an apparatus comprising means configured to: determine for one or more integrated access and backhaul nodes one or more respective actions to be taken by that integrated access and backhaul node in response to a radio link failure in a network of integrated access and backhaul nodes, said determining being dependent on one or more of: loading associated with one or more integrated access and backhaul nodes; and a status of one or more links between two or more of the integrated access and backhaul nodes.

20 Claims, 11 Drawing Sheets

(51) Int. Cl.
*H04W 76/19* (2018.01)
*H04W 88/08* (2009.01)

(56) References Cited

U.S. PATENT DOCUMENTS

| | | | | |
|---|---|---|---|---|
| 2021/0219368 | A1* | 7/2021 | Fujishiro | H04W 76/27 |
| 2021/0274381 | A1* | 9/2021 | Teyeb | H04L 1/1854 |
| 2021/0377757 | A1* | 12/2021 | Liu | H04L 1/1896 |
| 2022/0240103 | A1* | 7/2022 | Gummadi | H04W 76/27 |
| 2022/0279401 | A1* | 9/2022 | Wallentin | H04W 36/0079 |
| 2022/0386204 | A1* | 12/2022 | Parichehrehteroujeni | H04W 36/18 |
| 2022/0394797 | A1* | 12/2022 | Pradas | H04W 76/30 |
| 2023/0044810 | A1* | 2/2023 | Zhuo | H04W 72/27 |
| 2023/0053069 | A1* | 2/2023 | Ohlsson | H04W 36/0005 |
| 2023/0086398 | A1* | 3/2023 | Teyeb | H04W 76/19 |
| 2023/0164658 | A1* | 5/2023 | Ishii | H04W 36/0055 370/331 |
| 2023/0397084 | A1* | 12/2023 | Shah | H04W 40/12 |
| 2024/0056940 | A1* | 2/2024 | Lagrange | H04W 40/22 |

FOREIGN PATENT DOCUMENTS

| | | | |
|---|---|---|---|
| WO | 2019/246350 | A1 | 12/2019 |
| WO | 2020/051588 | A1 | 3/2020 |
| WO | 2020/056749 | A1 | 3/2020 |

OTHER PUBLICATIONS

"3rd Generation Partnership Project; Technical Specification Group Radio Access Network; NR; NR and NG-RAN Overall Description; Stage 2 (Release 17)", 3GPP TS 38.300, V17.0.0, Mar. 2022, pp. 1-204.

"3rd Generation Partnership Project; Technical Specification Group Radio Access Network; NR; Radio Resource Control (RRC) protocol specification (Release 16)", 3GPP TS 38.331, V16.3.1, Jan. 2021, pp. 1-932.

"Summary of the email discussion [106#43][IAB] Backhaul RLF", 3GPP TSG-RAN WG2 Meeting #107bis, R2-1912127, Agenda: 6.1.5.1, CATT, Oct. 14-18, 2019, 55 pages.

"Report from [Post112-e][066][eIAB] Topology Adaptation (QC)", 3GPP TSG-RAN WG2 Meeting #113e, R2-2102238, Agenda: 8.4.3, Qualcomm Incorporated, Jan. 21, 2021, pp. 1-47.

"3rd Generation Partnership Project; Technical Specification Group Radio Access Network; Evolved Universal Terrestrial Radio Access (E-UTRA) and NR; Multi-connectivity; Stage 2 (Release 16)", 3GPP TS 37.340, V16.4.0, Dec. 2020, pp. 1-84.

"Rel-17 IAB email discussion—report", 3GPP TSG RAN meeting #86, RP-193094, Agenda: 9.1.2, Qualcomm Incorporated, Dec. 9-12, 2019, 39 pages.

"On topology-adaptation enhancements", 3GPP TSG-RAN WG2 Meeting #112 Electronic, R2-2010671, Agenda: 8.4.3, Nokia, Nov. 2-13, 2020, 4 pages.

Office action received for corresponding Finnish Patent Application No. 20215821, dated Feb. 2, 2022, 6 pages.

Invitation to Pay Additional Fees received for corresponding Patent Cooperation Treaty Application No. PCT/US2022/038331, dated Nov. 14, 2022, 11 pages.

"Remaining Issues for IAB Routing", 3GPP TSG-RAN WG2 meeting #108, R2-1914514, Agenda: 6.1.3.1, Futurewei, Nov. 18-22, 2019, pp. 1-7.

International Search Report and Written Opinion received for corresponding Patent Cooperation Treaty Application No. PCT/US2022/038331, dated Jan. 26, 2023, 19 pages.

"3rd Generation Partnership Project; Technical Specification Group Radio Access Network; NG-RAN; F1 application protocol (F1AP) (Release 17)", 3GPP TS 38.473, V17.0.0, Apr. 2022, pp. 1-645.

* cited by examiner

Fig. 9

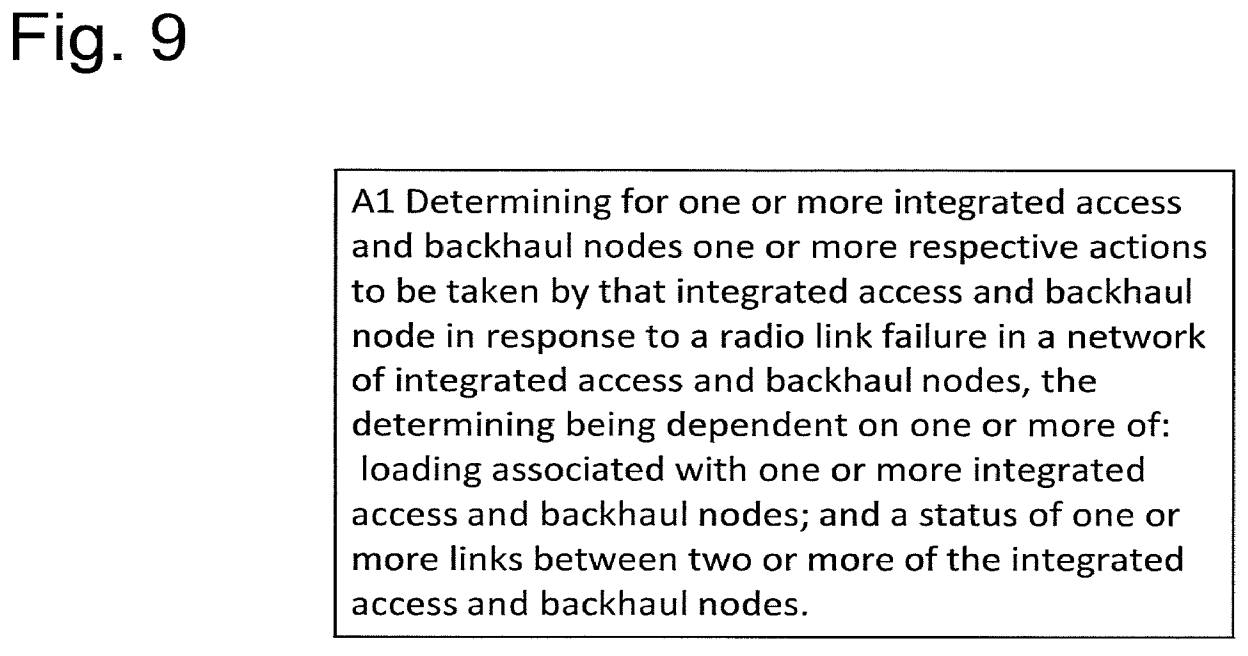

A1 Determining for one or more integrated access and backhaul nodes one or more respective actions to be taken by that integrated access and backhaul node in response to a radio link failure in a network of integrated access and backhaul nodes, the determining being dependent on one or more of: loading associated with one or more integrated access and backhaul nodes; and a status of one or more links between two or more of the integrated access and backhaul nodes.

DETERMINE ACTION TO TAKE IN RESPONSE TO RADIO LINK FAILURE IN A NETWORK OF IAB NODES

RELATED APPLICATION

This application claims priority to PCT Application No. PCT/US2022/038331, filed on Jul. 26, 2022, which claims priority to FI application No. 20215821, filed on Jul. 27, 2021, each of which is incorporated herein by reference in its entirety.

FIELD OF THE DISCLOSURE

The present disclosure relates to apparatus, methods, and computer programs and in particular, but not exclusively apparatus, methods, and computer programs for addressing radio link failures.

BACKGROUND

A communication system can be seen as a facility that enables communication sessions between two or more entities such as communication devices, base stations and/or other nodes by providing carriers between the various entities involved in the communications path.

The communication system may be a wireless communication system. Examples of wireless systems comprise public land mobile networks (PLMN) operating based on radio standards such as those provided by 3GPP, satellite based communication systems and different wireless local networks, for example wireless local area networks (WLAN). The wireless systems can typically be divided into cells, and are therefore often referred to as cellular systems.

The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio). Other examples of communication systems are the long-term evolution (LTE) of the Universal Mobile Telecommunications System (UMTS) radio-access technology and so-called 5G or New Radio (NR) networks.

SUMMARY

According to an aspect, there is provided an apparatus comprising means configured to: determine for one or more integrated access and backhaul nodes one or more respective actions to be taken by that integrated access and backhaul node in response to a radio link failure in a network of integrated access and backhaul nodes, said determining being dependent on one or more of: loading associated with one or more integrated access and backhaul nodes; and a status of one or more links between two or more of the integrated access and backhaul nodes.

The respective action may comprise one or more of: waiting for a radio link failure to end and attempting to re-establish a link to an original to integrated access and backhaul node; sending a failure indication to a child integrated access and backhaul node; attempting to establish a new connection to any reachable integrated access and backhaul node; and attempting handover to an ordered list of integrated access and backhaul nodes.

Each link may be an established link or a link which is establishable during a handover.

The means may be further configured to collect information from two or more of the integrated access and backhaul nodes about one or more of: the loading associated with one or more integrated access and backhaul nodes; and the one or more links between two or more of the integrated access and backhaul nodes.

The means may be further configured to cause information about the one or more respective actions to be taken by a respective integrated access and backhaul node in response to a radio link failure to be transmitted to the respective integrated access and backhaul node.

The means may be configured to perform the determining of the one or more actions, prior to an occurrence of a radio link failure.

The means may be configured to determine the one or more actions based on one or more load related criteria.

The apparatus may be provided in an integrated access and backhaul node or be an integrated access and backhaul node.

According to another aspect, there is provided an apparatus comprising means configured to: receive information indicating one or more respective actions to be taken by an integrated access and backhaul node in response to a radio link failure in a network of integrated access and backhaul nodes; determine a radio link failure; and in response perform one or more of said one or more respective actions to attempt a radio link failure recovery.

The respective action may comprise one or more of: waiting for a radio link failure to end and attempting to re-establish a link to an original to integrated access and backhaul node: sending a failure indication to a child integrated access and backhaul node; attempting to establish a new connection to any reachable integrated access and backhaul node; and attempting handover to an ordered list of integrated access and backhaul nodes.

The means may be further configured to determine that a radio link failure recovery has failed and in response to send an indication to a parent integrated access and backhaul node.

The means may be further configured to determine that a radio link failure recovery has failed within a given time period and in response to attempt a different radio link failure recovery to that provided by the one or more actions.

The means may be further configured to determine a radio link failure responsive to information received from another node.

The apparatus may be provided in an integrated access and backhaul node or be an integrated access and backhaul node.

According to another aspect, there is provided an apparatus comprising at least one processor and at least one memory including a computer program code, the at least one memory and computer program code configured to, with the at least one processor, cause the apparatus at least to: determine for one or more integrated access and backhaul nodes one or more respective actions to be taken by that integrated access and backhaul node in response to a radio link failure in a network of integrated access and backhaul nodes, said determining being dependent on one or more of: loading associated with one or more integrated access and backhaul nodes; and a status of one or more links between two or more of the integrated access and backhaul nodes.

The respective action may comprise one or more of: waiting for a radio link failure to end and attempting to re-establish a link to an original to integrated access and backhaul node; sending a failure indication to a child integrated access and backhaul node; attempting to establish a new connection to any reachable integrated access and backhaul node; and attempting handover to an ordered list of integrated access and backhaul nodes.

Each link may be an established link or a link which is establishable during a handover.

The at least one memory and at least one processor may be configured to cause the apparatus to collect information from two or more of the integrated access and backhaul nodes about one or more of: the loading associated with one or more integrated access and backhaul nodes; and the one or more links between two or more of the integrated access and backhaul nodes.

The at least one memory and at least one processor may be configured to cause the apparatus to cause information about the one or more respective actions to be taken by a respective integrated access and backhaul node in response to a radio link failure to be transmitted to the respective integrated access and backhaul node.

The at least one memory and at least one processor may be configured to cause the apparatus to perform the determining of the one or more actions, prior to an occurrence of a radio link failure.

The at least one memory and at least one processor may be configured to cause the apparatus to determine the one or more actions based on one or more load related criteria.

The apparatus may be provided in an integrated access and backhaul node or be an integrated access and backhaul node.

According to another aspect, there is provided an apparatus comprising at least one processor and at least one memory including a computer program code, the at least one memory and computer program code configured to, with the at least one processor, cause the apparatus at least to: receive information indicating one or more respective actions to be taken by an integrated access and backhaul node in response to a radio link failure in a network of integrated access and backhaul nodes; determine a radio link failure; and in response perform one or more of said one or more respective actions to attempt a radio link failure recovery.

The respective action may comprise one or more of: waiting for a radio link failure to end and attempting to re-establish a link to an original to integrated access and backhaul node: sending a failure indication to a child integrated access and backhaul node; attempting to establish a new connection to any reachable integrated access and backhaul node; and attempting handover to an ordered list of integrated access and backhaul nodes.

The at least one memory and at least one processor may be configured to cause the apparatus to determine that a radio link failure recovery has failed and in response to send an indication to a parent integrated access and backhaul node.

The at least one memory and at least one processor may be configured to cause the apparatus to determine that a radio link failure recovery has failed within a given time period and in response to attempt a different radio link failure recovery to that provided by the one or more actions.

The at least one memory and at least one processor may be configured to cause the apparatus to determine a radio link failure responsive to information received from another node.

The apparatus may be provided in an integrated access and backhaul node or be an integrated access and backhaul node.

According to an aspect, there is provided a method comprising: determining for one or more integrated access and backhaul nodes one or more respective actions to be taken by that integrated access and backhaul node in response to a radio link failure in a network of integrated access and backhaul nodes, said determining being dependent on one or more of: loading associated with one or more integrated access and backhaul nodes; and a status of one or more links between two or more of the integrated access and backhaul nodes.

The respective action may comprise one or more of: waiting for a radio link failure to end and attempting to re-establish a link to an original to integrated access and backhaul node; sending a failure indication to a child integrated access and backhaul node; attempting to establish a new connection to any reachable integrated access and backhaul node; and attempting handover to an ordered list of integrated access and backhaul nodes.

Each link may be an established link or a link which is establishable during a handover.

The method may comprise collecting information from two or more of the integrated access and backhaul nodes about one or more of: the loading associated with one or more integrated access and backhaul nodes; and the one or more links between two or more of the integrated access and backhaul nodes.

The method may comprise causing information about the one or more respective actions to be taken by a respective integrated access and backhaul node in response to a radio link failure to be transmitted to the respective integrated access and backhaul node.

The method may comprise performing the determining of the one or more actions, prior to an occurrence of a radio link failure.

The method may comprise determining the one or more actions based on one or more load related criteria.

The method may be performed by an apparatus. The apparatus may be provided in an integrated access and backhaul node or be an integrated access and backhaul node.

According to another aspect, there is provided a method comprising: receiving information indicating one or more respective actions to be taken by an integrated access and backhaul node in response to a radio link failure in a network of integrated access and backhaul nodes; determining a radio link failure; and in response performing one or more of said one or more respective actions to attempt a radio link failure recovery.

The respective action may comprise one or more of: waiting for a radio link failure to end and attempting to re-establish a link to an original to integrated access and backhaul node: sending a failure indication to a child integrated access and backhaul node; attempting to establish a new connection to any reachable integrated access and backhaul node; and attempting handover to an ordered list of integrated access and backhaul nodes.

The method may comprise determining that a radio link failure recovery has failed and in response to send an indication to a parent integrated access and backhaul node.

The method may comprise determining that a radio link failure recovery has failed within a given time period and in response to attempt a different radio link failure recovery to that provided by the one or more actions.

The method may comprise determining a radio link failure responsive to information received from another node.

The method may be performed by an apparatus. The apparatus may be provided in an integrated access and backhaul node or be an integrated access and backhaul node.

According to an aspect, there is provided a computer readable medium comprising program instructions for causing an apparatus to perform at least one of the above methods.

According to an aspect, there is provided a non-transitory computer readable medium comprising program instructions for causing an apparatus to perform at least the method according to any of the preceding aspects.

According to an aspect, there is provided a non-volatile tangible memory medium comprising program instructions stored thereon for performing at least one of the above methods.

In the above, many different aspects have been described. It should be appreciated that further aspects may be provided by the combination of any two or more of the aspects described above.

Various other aspects are also described in the following detailed description and in the attached claims.

BRIEF DESCRIPTION OF THE FIGURES

Embodiments will now be described, by way of example only, with reference to the accompanying Figures in which:

FIG. 9 shows another method of some embodiments.

DETAILED DESCRIPTION

In the following certain examples are explained with reference to mobile communication devices capable of communication via a wireless cellular system and mobile communication systems serving such mobile communication devices. Before explaining in detail the examples, certain general principles of a wireless communication system, access systems thereof, and mobile communication devices are briefly explained with reference to FIGS. 1, 2, and 3 to assist in understanding the technology underlying the described examples.

Figure 1:
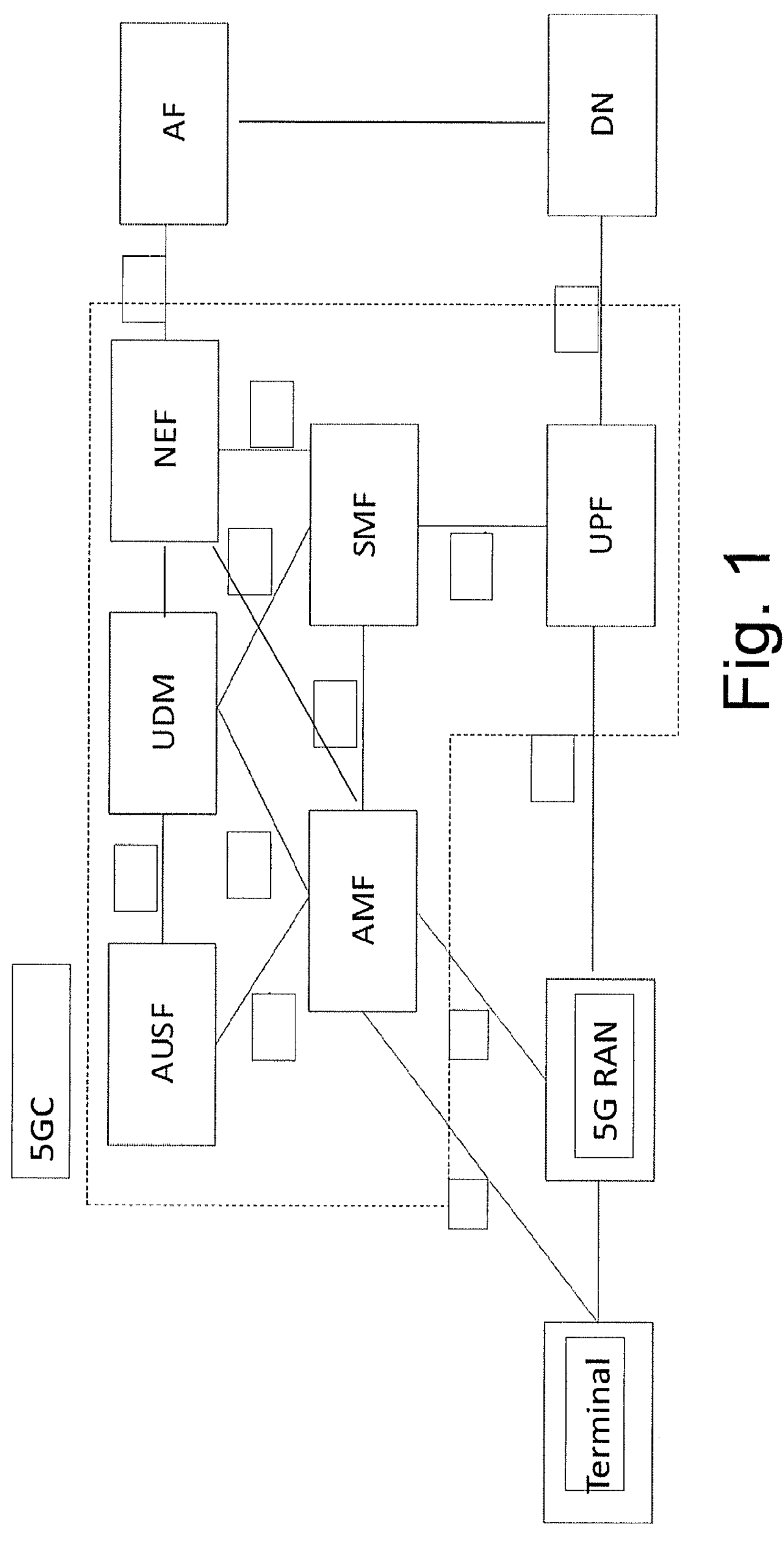
FIG. 1 shows a schematic diagram of an example 5G system.

FIG. 1 shows a schematic representation of a 5G system (5GS). The 5GS may be comprised by a terminal or user equipment (UE), a 5G radio access network (5GRAN) or next generation radio access network (NG-RAN), a 5G core network (5GC), one or more application function (AF) and one or more data networks (DN).

The 5G-RAN may comprise one or more base stations. In 5G the base station may be referred to as a gNodeB (gNB). The RAN may comprise one or more gNodeB (gNB) (or base station) distributed unit functions connected to one or more gNodeB (gNB) (or base station) centralized unit functions.

The 5GC may comprise the following entities: Network Slice Selection Function (NSSF); Network Exposure Function; Network Repository Function (NRF); Policy Control Function (PCF); Unified Data Management (UDM); Application Function (AF); Authentication Server Function (AUSF); an Access and Mobility Management Function (AMF); and Session Management Function (SMF).

Figure 2:
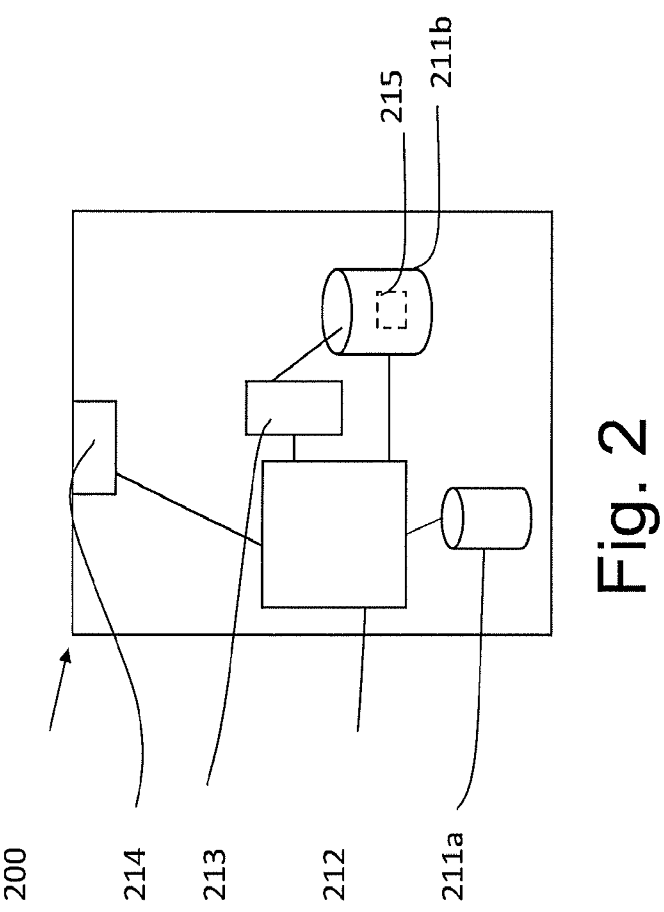
FIG. 2 shows a schematic diagram of an example apparatus.

FIG. 2 illustrates an example of an apparatus 200. This apparatus may be provided for example in a node such as an IAB node. The apparatus may comprise at least one memory. By way of example only the at least one memory may comprise random access memory (RAM) 211*a* and at least on read only memory (ROM) 211*b*. Apparatus used by other embodiments may comprise different memory.

The apparatus may comprise at least one processor 212, 213. In this example apparatus, two processors are show.

The apparatus may comprise an input/output interface 214.

The at least one processor may be coupled to the at least one memory. The at least one processor may be configured to execute an appropriate software code 215. The software code 215 may for example allow the method of some embodiments to be performed.

The software code 215 may be stored in the at least one memory, for example ROM 211*b*.

IAB (integrated access and backhaul) is an architecture which enables wireless relaying. This architecture is being standardized for 3GPP Rel-16 that enables relaying functionality. IAB may provide wireless relaying in 5G networks. This may be provided in the RAN.

Examples of the features that may be supported by this architecture comprise one or more of:

Multi-hop backhauling

QoS differentiation and enforcement

Support for topology adaptation and redundant connectivity

In-band and out-band relaying

Support for legacy terminals.

Reference is made to FIG. 3 which shows two examples of an IAB architecture. In a network supporting IAB, an IAB donor may be an access point, such as a gNB, with additional functionality to support IAB. The IAB donor may provide a UE with access to the network through a sequence of backhaul and access links. An IAB node may be connected to the IAB donor through one or more hops, forming a DAG (directed acyclic graph) with the IAB donor being the root.

Figure 3B:
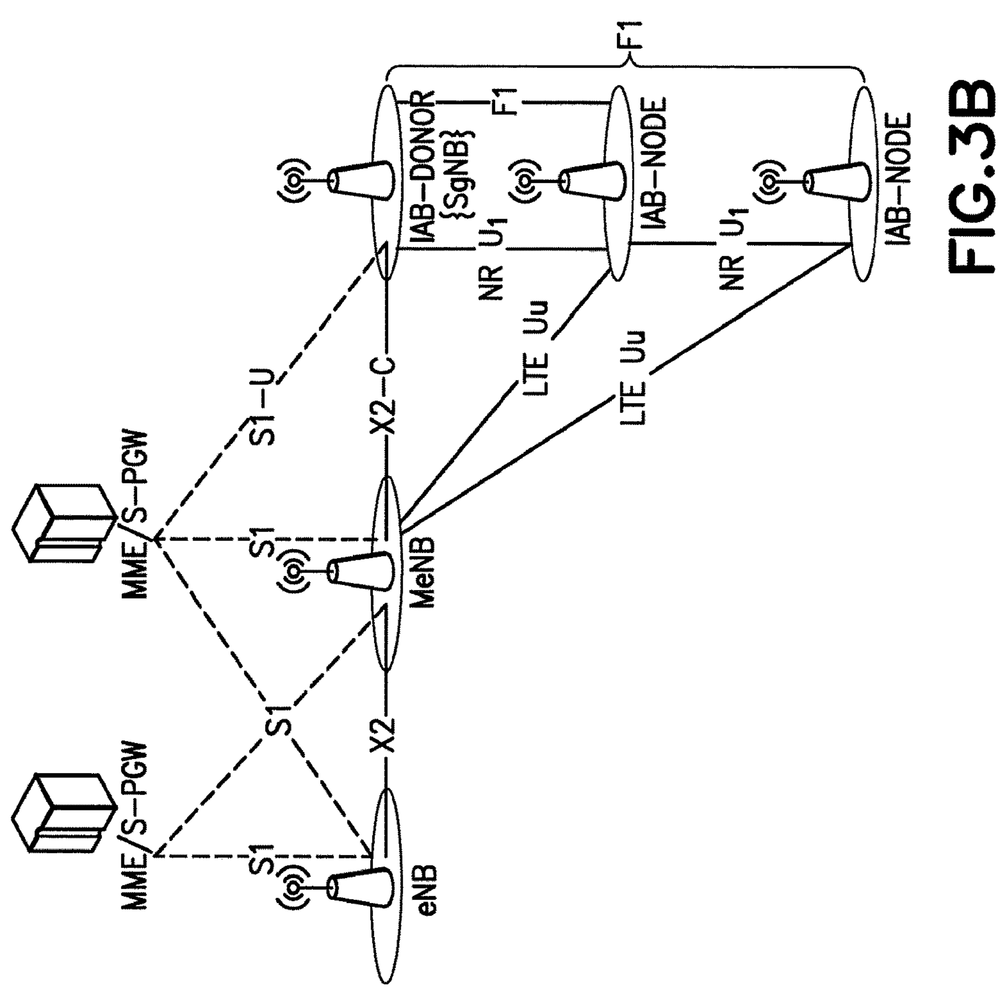
FIG. 3*b* schematically shows an IAB architecture. with dual connectivity.
Figure 3A:
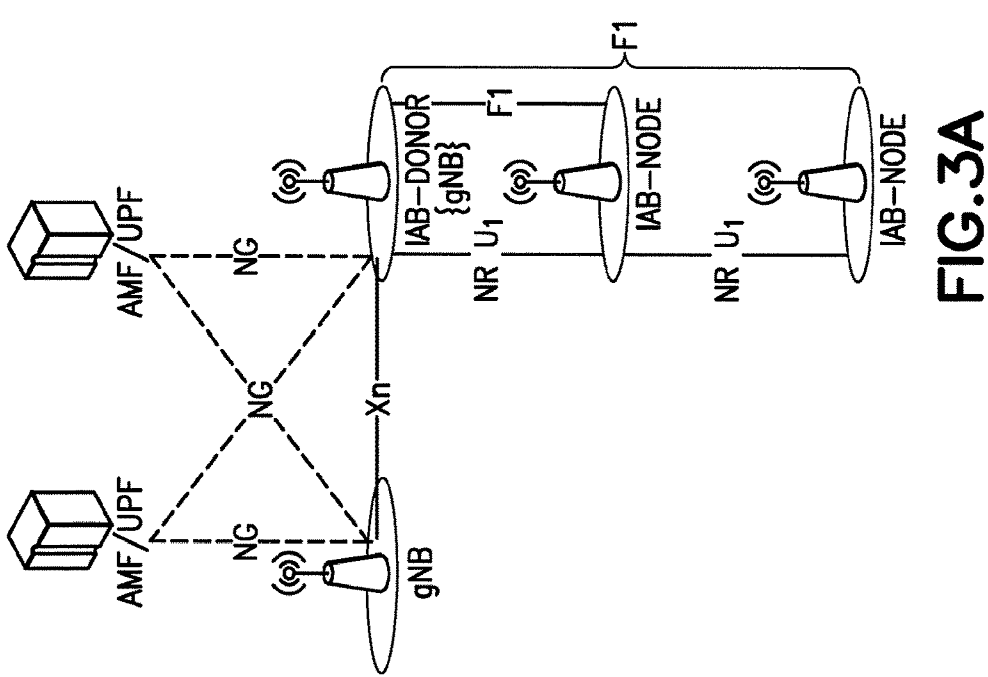
FIG. 3*a* schematically shows an IAB (integrated access and backhaul) architecture with standalone connectivity.

In the example of FIG. 3*a*, which depicts a standalone connectivity arrangement, a gNB is in communication with an IAB-donor gNB via an Xn interface. The Xn interface is the network interface between NG-RAN nodes. The gNB and IAB-donor gNB are in communication with two different AMF/UPFs via a respective NG interface. The IAB-donor gNB is separately in communication with two IAB nodes, via an F1 interface and an NR Uu interface. Uu is the radio interface between radio access network and the user equipment or an IAB-MT. F1 is the interface for 5G radio access network between gNB-CU (central unit) and gNB-DU (distributed unit).

An example IAB architecture with dual connectivity is shown in FIG. 3*b*. In the example of FIG. 3*b*, which depicts a dual connectivity arrangement in an LTE system. An eNB (eNodeB B is a LTE base station) is in communication with an MeNB (master eNodeB) via an X2 interface, which in turn is in connection with an IAB-donor node via an X2-C interface. The eNB and MeNB are in communication with respective MME/S-PGWs (mobility management entity/serving packet gateway) via respective S1 interfaces/The IAB-donor are in communication with an MME/S-PGW via an S1-U interface. The MeNB is separately in communication with two different IAB nodes via an LTE Uu interface. The IAB-donor is separately in communication with the two IAB nodes, via an F1 interface and an NR Uu interface.

In FIG. 3*a* and FIG. 3*b*, the IAB donor node is connected to other IAB nodes over the air. This may provide the possibility to easily gain sufficient coverage, without the necessity to install fibres for the interconnection of base stations. This may be the case where for example the so called FR2 (24.25 GHz to 52.6 GHZ) frequency range is used.

IAB leverages the CU/DU split. This allows the split of a base station such as a gNB into a central unit (CU) and a distributed unit (DU). An interface such as the F1 interface may be provided between the CU and the DU.

The IAB donor node comprises a donor CU and the IAB donor DU. The other IAB nodes are connected to the IAB donor CU via the F1 interface. This may be carried on the BAP/MAC/RLC/PHY (backhaul adaption protocol/medium access control/radio link control/physical layer) protocol stack.

The IAB nodes may form a complex network with multihopping and multi-connection. Given such a network, an issue arises how to deal with RLFs (radio link failure). In principle there may be two possibilities: the routing of the backhaul traffic is redirected (implying that the node was dual or multiconnected to the IAB donor before the RLF) or the IAB node tries to setup a new connection via HO (handover) or CHO (conditional handover) procedures.

An IAB node may support gNB-DU functionality as well as a limited set of UE functionalities. An IAB node may contain an MT (mobile termination)-part (also referred to as IAB-MT) which is used to communicate with a parent node and a DU part (also referred to as IAB-DU) which is used to communicate with a child node or with a regular UE. An IAB-MT may include, for example, one or more of a physical layer, layer-2, RRC and NAS functionality.

The IAB-MT node may be configured to connect to at least one of:

the gNB-DU of another IAB-node or the IAB-donor;

the gNB-CU on the IAB-donor; or the core network.

A IAB-MT node may direct connect to the DUs of the IAB nodes or the DU of the donor node. However, logical connections are also established to the CU and the core network.

The next hop of an IAB-MT may either be an IAB-MT of another IAB-node or an IAB-donor DU. The neighbour node on the IAB-DU's interface is herein referred to as child node and the neighbour node on the IAB-MT's interface is herein referred to as parent node. An example child/parent relationship is shown in FIG. 4.

Figure 4:
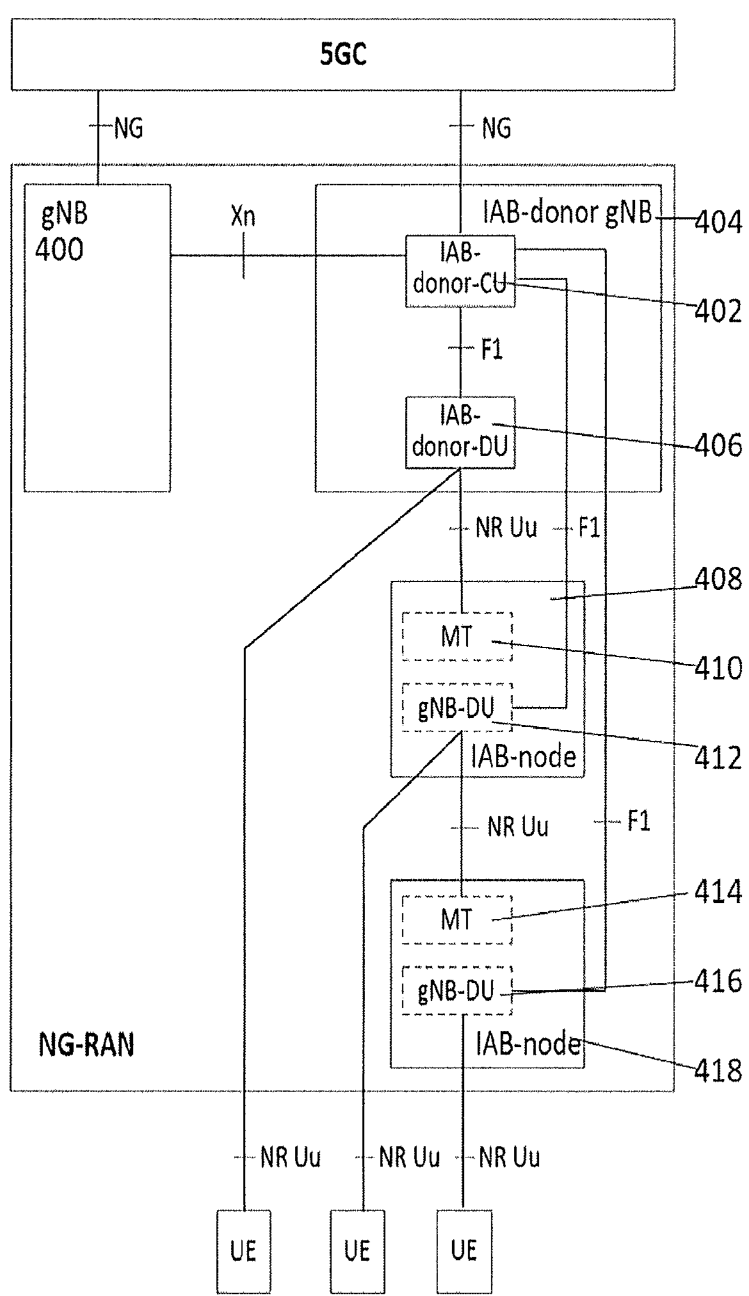
FIG. 4 shows an example of an IAB parent/child node relationship.

In the example of FIG. 4, a gNB 400 is in communication with the IAB donor CU 402 of the IAB donor gNB 404 via the Xn interface. The IAB-CU is in communication with a IAB donor DU 406 of the IAB donor gNB 404 via the F1 interface.

The IAB donor DU 406 of the IAB donor gNB 404 communicates via the NR Uu interface with the MT part 410 of a first IAB node 408. The IAB donor CU 402 of the IAB donor gNB 404 communicates with the gNB-DU part 412 of the first IAB node 408 via an FI interface.

The gNB-DU part 412 of the first IAB node 408 communicates via the NR Uu interface with a MT part 414 of a second IAB node 418. The IAB donor CU 402 of the IAB donor gNB 404 communicates with the gNB-DU part 416 of the second IAB node 418 via an FI interface.

The IAB donor DU 406 of the IAB donor gNB 404 communicates with a UE (or other communication device) via a NR Uu interface. The gNB-DU part 412 of the first IAB node 408 communicates with another UE (or other communication device) via a NR Uu interface. The gNB-DU part 416 of the second IAB node 418 communicates with another UE (or other communication device) via a NR Uu interface.

In this example there are two IAB nodes in addition to the IAB donor gNB. This is by way of example only. In other embodiments, there may be no IAB nodes, one IAB node or more than two IAB nodes.

The IAB-specific Backhaul Adaptation Protocol (BAP) may be used to enable transport of traffic through the wireless interface between IAB nodes. In BAP, each IAB-donor may assign the nodes it controls an L2 address. This is called a BAP address. The BAP address may be used in forwarding of traffic. A BAP address can be associated with multiple route IDs in case there are multiple paths.

Each IAB node may maintain a table of routing information of the next hop for each BAP routing ID. Tables may be separate for DL and UL, where the DU of the IAB node uses the DL part and MT of the IAB node uses the UL part.

Each IAB node may be given an IP address which is used subsequently to route traffic through intermediate IAB nodes. For in-band IAB operation the IAB-DU inside an IAB-node may share common frequencies with an IAB-MT. Thus, an IAB-MT may not transmit when the IAB-DU is receiving and the vice versa.

Figure 5:
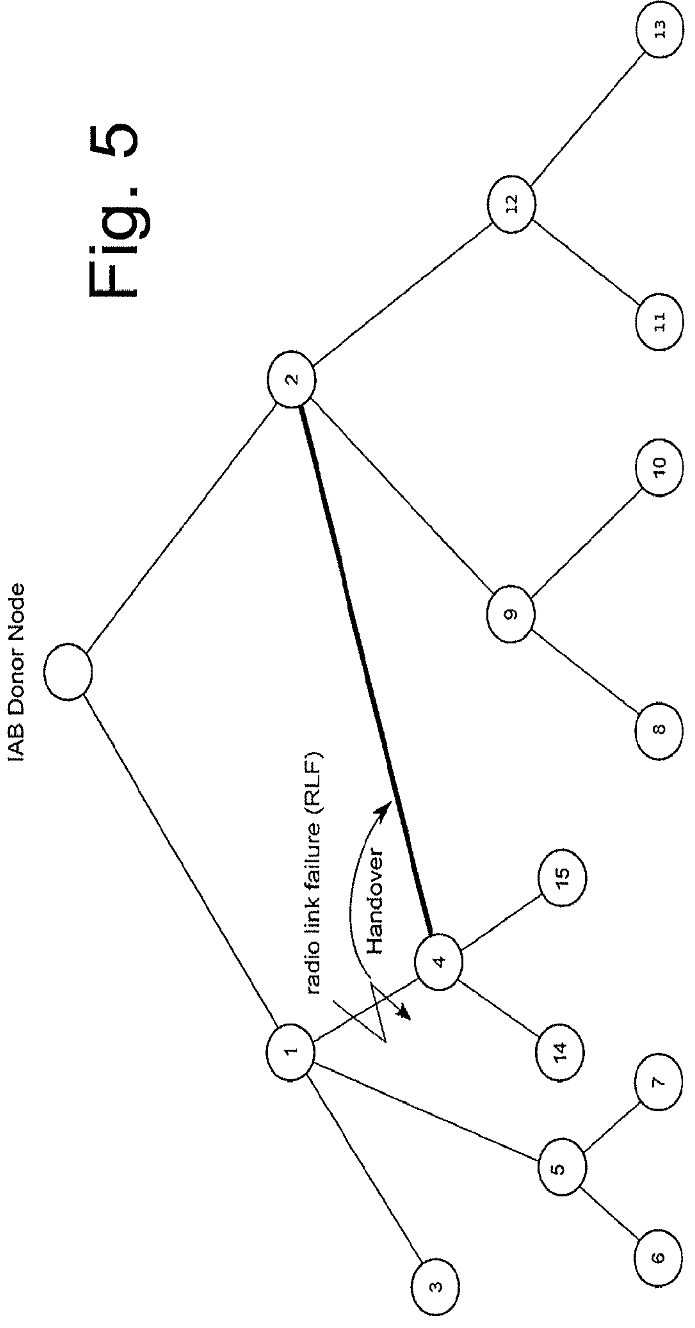
FIG. 5 shows an example IAB network.

Reference is made to FIG. 5 shows an IAB network. The network comprises IAB donor node which is connected to IAB nodes 1 and 2. IAB node 1 is connected to IAB nodes 3, 4 and 5. IAB node 5 is connected to IAB nodes 6 and 7. IAB node 4 is connected to IAB nodes 14, 15 and 2. IAB node 2 is also connected to IAB nodes 9 and 12. IAB node 9 is connected to IAB nodes 8 and 10. IAB node 12 is connected to IAB nodes 11 and 13. The connections between the nodes may be radio connections. In this example, IAB node 4 is experiencing an RLF failure and tries to recover from this by setting up a new link to node 2 using CHO or handover.

Currently, the recovery procedure defined in 6 Release 16 of the of 3GPP standards T38.300 and TS38.401 is as follows. The IAB node losing a connection to a parent node (node 1 in this example), can migrate to another parent node (including RRC (radio resource control) re-establishment at recovery parent IAB-node DU and migration to new CU with a topology adaptation procedure). In this example, the new parent node may be IAB node 2. In case this is not possible, this node (IAB node 4) generates an RLF indication for its child nodes (IAB nodes 14 and 15 in this example). The child nodes try to recover from the link failure. If this is also not possible, the respective child node sends an RLF to its child nodes and so on.

However with the current procedure, where the RLF is only signalled after a recovery has failed, may lead to significant delays in larger networks.

It has been suggested to introduce different RLF types. The so-called type 2 RLF has the meaning of 'parent node is in RLF status and is trying to recover'. The intention is to allow child nodes to recover even before the recovery at the parent node has failed. However, this may lead to unpredictable behaviour.

Table 1 below provides some options for reactions after receiving a type 2 RLF.

| Option | Affected nodes | CHO | RLF recovery (HO) |
|---|---|---|---|
| Option 1 | All | No | No |
| Option 2 | Child node | Yes | No |
| Option 3 | Child node | Yes | Yes |
| Option 4 | Entire subtree | Yes | No |
| Option 5 | Entire subtree | Yes | Yes |

Depending on the option, there may be limits on a recovery procedure which a child node can take on reception of a type 2 RLF. For example, only CHO may be allowed and not HO, or the subtree is restricted, where this recovery is allowed.

The aim of some embodiments for network recovery following link failure may be to ensure that the new IAB network is as stable as possible and performing as expected.

It has been proposed that the node which is nearest to the failed link and can perform a C(HO) is connected to the rest of the still working IAB network.

However, for improved network performance, in some embodiments that node should perform a (C)HO, which allows for the best signal quality and highest data capacity. At the same time, recovery in some embodiments should be predictable and fast.

Some embodiments aim to address overall network stability and performance. Current methods only try to mitigate long interruption times and instability during the recovery process.

The recovery techniques of Release 16 of the of 3GPP standards T38.300 and TS38.401 as described previously do not provide any methods which control the network behaviour of the resulting network after recovery. The current discussion in Release 17 focusses on fast reestablishment of individual connectivity and the stability of the recovery process. This may help to overcome the problem of release 16, that the RLF failure indications migrate slowly, as each node first tries to do a handover or conditional handover and forwards the RLF only after this fails. This behaviour can lead to tens of seconds interruption time, which interrupts the services for the whole subtree.

Some embodiments may address or solve the problem, that the subtree, which was isolated before, is thereafter connected to a node, which is overloaded or the link shows a poor signal quality, although there may be better alternative nodes available.

Figure 6A:
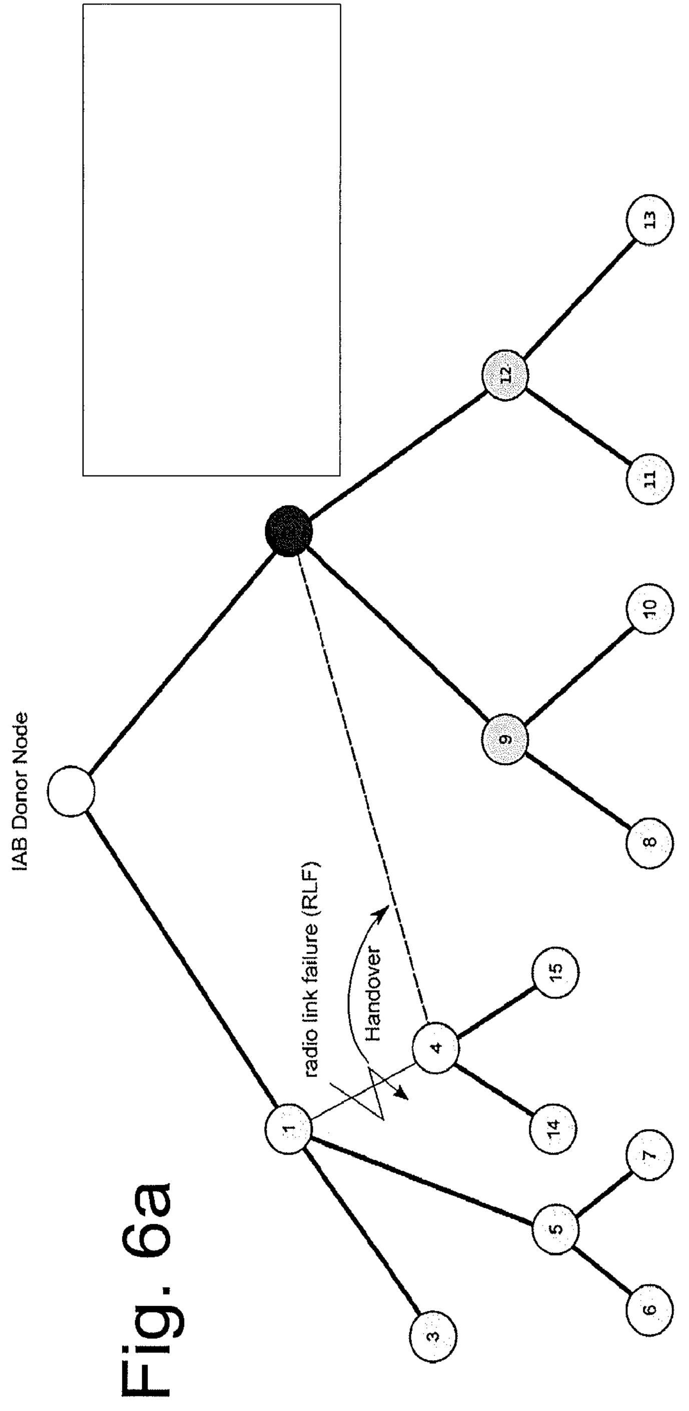
FIG. 6*a* illustrates behaviour in the event of a radio link failure in the IAB network of FIG. 5.

Reference is made to FIG. 6*a* which show the same example network of IAB donor node and IAB nodes 1 to 15 as shown in FIG. 5. In this example, nodes 1, 3, 4, 5, 6, 7, 8, 10, 11, 13, 14 and 15 have a low load. Nodes 9 and 12 have a medium load and node 2 has a medium or even a high load.

A radio link failure between node 1 and 4 occurs and node 4 tries to resolve that issue. It detects that it can setup a new connection to node 2. However, the link between node 4 and node 2 is of poor quality and node 2 is already relatively highly loaded. This is increased even more as now node 2 also has to carry the traffic from node 4, 14 and 15. With the prior arrangements, the link between node 1 and node 4 is handed over to node 2.

Figure 6B:
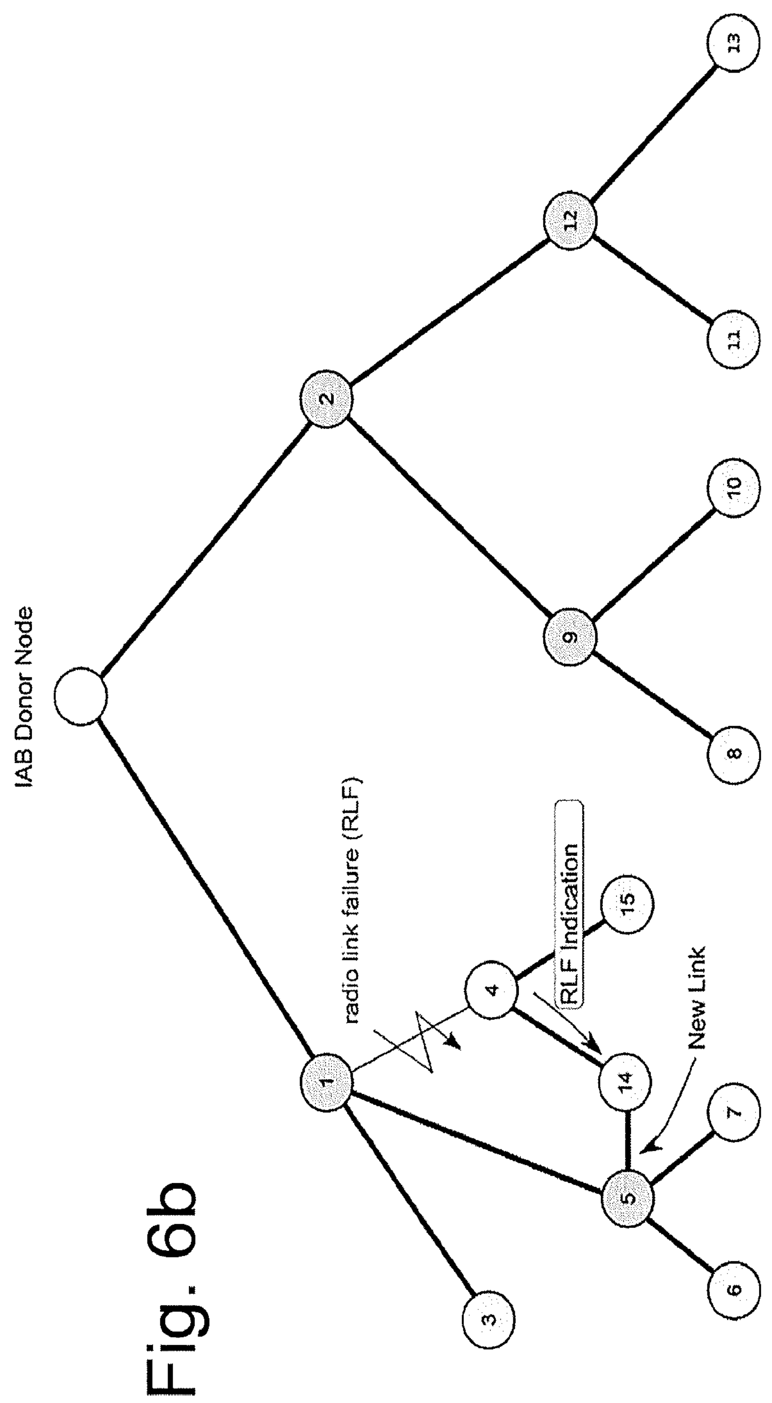
FIG. 6*b* illustrates behaviour in the event of a radio link failure in the IAB network of FIG. 5 of some embodiments.

Reference is made to FIG. 6*b* which shows the behaviour in some embodiments for the network of FIG. 5*a*. In this example, node 4 is configured to react to the RLF between nodes 1 and 4 by passing the RLF indication to node 14. This may be without prior checking of possible links to other nodes. This can be achieved relatively quickly. Node 14 is configured to connect to node 5 and to become the parent of nodes 4 and 15.

As a result, a link for connecting the previous isolated subtree is used, which has better properties concerning data rate and stability. Further the load is better balanced and node 2 does not have to take additional traffic from nodes 4, 14 and 15. Node 5 has an increased load but is still only a medium load. Node 2 may only have a medium load in this scenario.

Some embodiments use a configuration of the node behaviour in case of an RLF by the IAB donor CU. In case of RLF the nodes try to recover the connectivity according to this configuration. If this is not possible, a default behaviour is defined, which allows all nodes to connect to any other node providing connectivity.

As the node behaviour is preconfigured, the transfer of the RLF indication is faster, as each node only needs to lookup if a (C)HO is configured. If not the RLF indication is forwarded to the child nodes.

Some embodiments may provide the following method.

Figure 7:
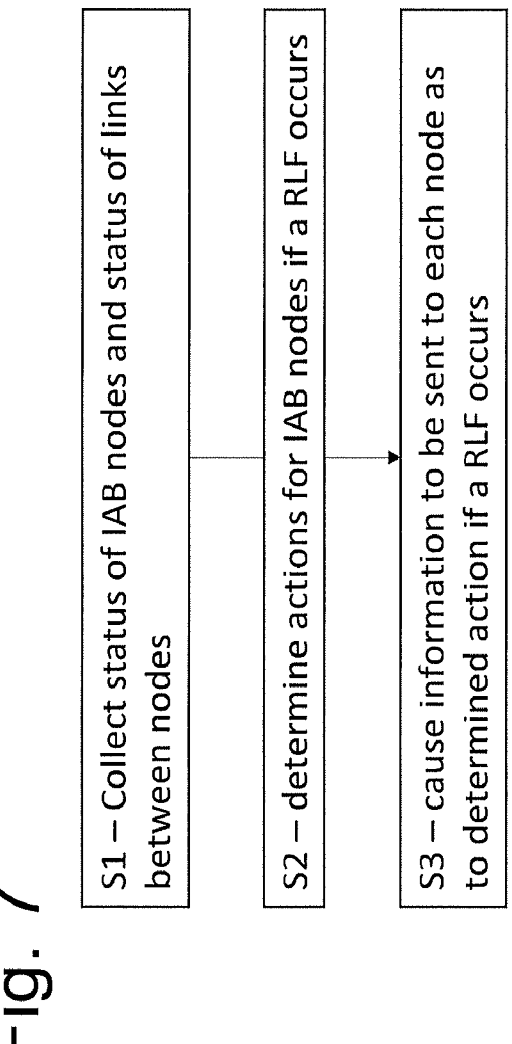
FIG. 7 shows a method of some embodiments.

The initialization of the recovery process will now be described with reference to FIG. 7. The initialization process may be done prior to the reception of any RLF.

In step S1, the CU I the IAB donor collects the following information:

- status of the IAB nodes. This may include load information.
- status of the links between the IAB nodes. This may include information about links which are either established or which can be established during a handover/

For the collection of the data, standard messaging, and procedures may be used.

As an example, in 3GPP TS 38.473 the following F1AP procedures are defined: 'Resource Status Reporting Initiation' and 'Resource Status Reporting'. F1AP is part of the F1 interface, which is set-up during the IAB node integration process. The first procedure sets up a measurement. Therefore, the CU sends a 'Resource Status Request Message' to the DU, which replies with a 'Resource Status Response' if it can perform the measurement or with a 'Resource Status Failure' if it cannot. As soon as the DU has measurement results to report, it uses the 'Resource Status Reporting' procedure. Herewith a 'Resource Status Update' message is sent from the DU to the CU. It should be appreciated that other messaging and procedures may be followed for embodiments implemented in a different standard.

In step S2, depending on this information, the CU determines possible reactions of the IAB nodes on radio link failures for all links.

This may be determined based on one or more criteria. For example, a first criteria would be a load forecast, to see if there will not be any overload situations after the RLF failure had been recovered. Another criteria may be a load balancing criteria. Other embodiments may use other load related criteria.

One or more of the following reactions can be configured:

- try to do a handover to an ordered list of given nodes. The order of the items states to which node a connection attempt should be done first, second and so on. If all attempts fail, a bh-RLF (back haul radio link failure) indication is sent to the child nodes
- do not try to do a handover, but send a bh-RLF failure indication to the child nodes try to establish a new connection to an arbitrary node reachable wait for the problem of the RLF to disappear and try to reconnect to the original node (in case the failure cannot be handled by the subtree, it may be better to keep the subtree configuration and to simply wait for RLF to disappear)

In step S3, the configured reactions are sent to each node and stored by each node. Different nodes may have different configured reactions. The RLF handling may be part of the BAP layer. The configuration may store in the BAP layer entries which connect the DU and the MT in an IAB node.

Currently, the direct traffic flows between the IAB nodes include the donor DU and the CU. In this scenario, the CU may simply meter the load for the different IAB nodes and knowing the architecture it can also map the load on the different links between the IAB nodes.

In some embodiments, the donor DU may perform the initialization. Where the CU is the termination point of the F1 interface, the DU may communicate the RLF configuration via the CU.

This process may process may be running continuously or may be repeated at given time intervals.

Transmission of the messages can be done via an RRC protocol, an OAM (operation and maintenance) protocol, via F1AP (application protocol for control information on the F1 interface (see for example TS 38.473)) or via any other suitable protocol.

In the following table, it is shown modifications for the F1AP protocol provided by some embodiments. For the other options, the data model would be similar.

If not, the next step is step T3 where the behaviour as set out in for example Release 16 or any other default behaviour is followed.

In some embodiments, step T2 is omitted. This may be the case where the network is such that the behaviour of the node in the event of RLF is always configured or there may be a default option which is considered to be the behaviour to be followed in the absence of other behaviour.

If the RLF behaviour has been configured, then the next step is step T4 in which it is the configured action is attempted. If a configured action fails, then the next configured action is attempted, if there is more than one configured action.

If the configured action is to perform a CHO, then a CHO is performed to the conditional node.

If the configured action is to perform a HO, then a HO is performed to the required node.

If the configured action is to forward the RLF to the child node, then the RLF is forwarded to the child node.

Other embodiments may provide a different configured action in some embodiments.

In step T5, it is determined if the configured action is successful.

If so the method ends in step T6. The method may operate in the user plane. This may allow the method to be fast and with a minimal overhead If the configured action is not successful, the IAB node has no further children and the IAB node cannot recover the failure, then in step T7 the node sends an RLF recovery failed indication to its parent node(s). This may provide a back-up mechanism in case there is a misconfiguration. An

| IE/Group Name | Presence M: mandatory O: optional | Range | IE type and reference in 38.473 | Semantics description | Criticality | Assigned Criticality |
|---|---|---|---|---|---|---|
| Message Type | M | | 9.3.1.1 | | YES | ignore |
| Transaction ID | M | | 9.3.1.23 | This IE is ignored if received in UE associated signalling message. | YES | reject |
| gNB-CU UE F1AP ID | O | | 9.3.1.4 | | YES | ignore |
| gNB-DU UE F1AP ID | O | | 9.3.1.5 | | YES | reject |
| RLF-Behaviour | M | 1 . . . n | new | | YES | ignore |
| > CHO | O | 1 | new | | YES | ignore |
| >> gNB-DU UE F1AP ID | M | 1 | 9.3.1.5 | | YES | ignore |
| > HO | O | 1 | new | | Yes | ignore |
| >> gNB-DU UE F1AP ID | M | 1 | 9.3.1.5 | | YES | ignore |
| > ForwardRLF | O | 1 | new | | YES | ignore |

Figure 8:
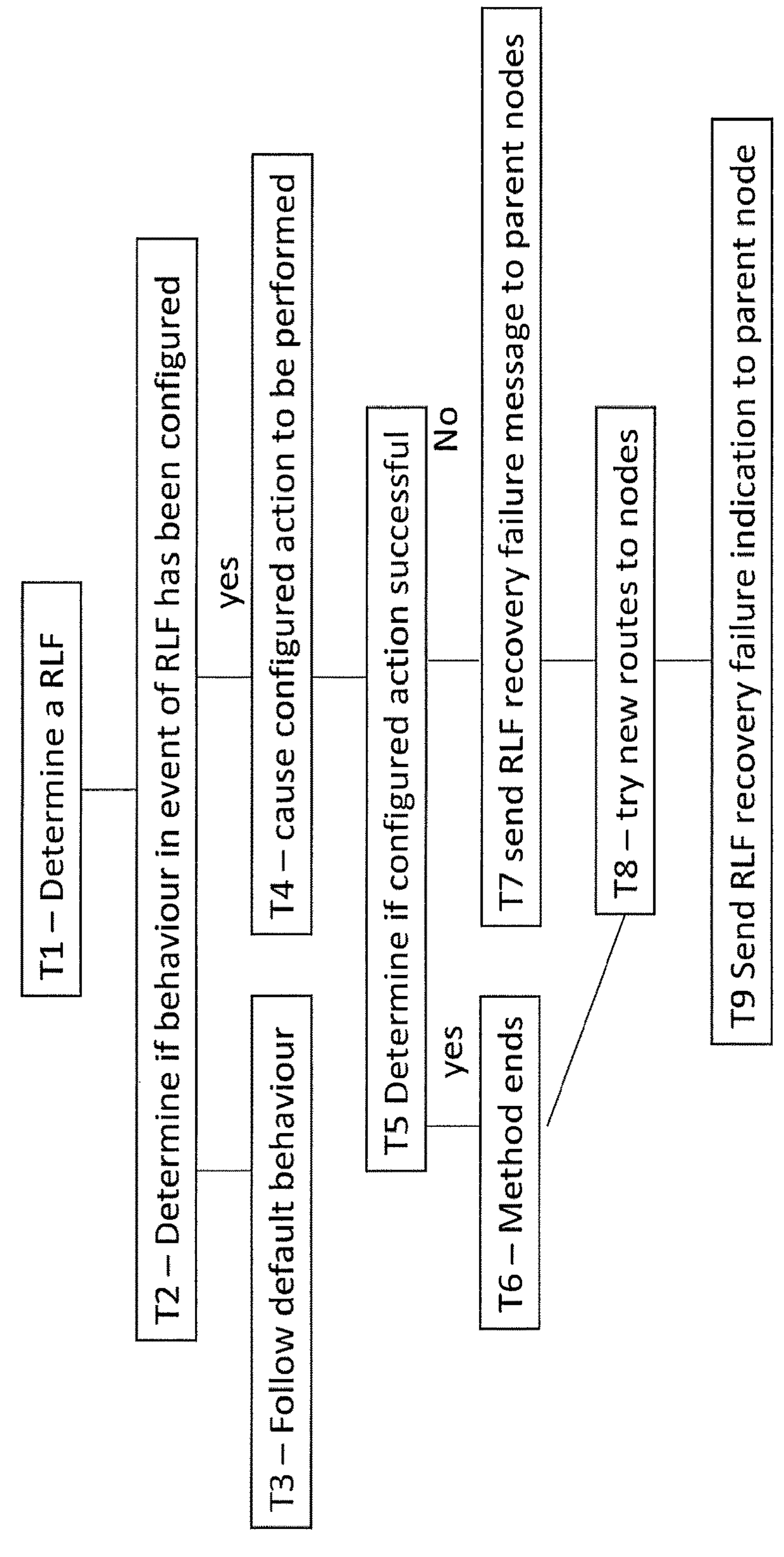
FIG. 8 shows another method of some embodiments.

A node reaction on an RLF will now be described with reference to FIG. 8.

Given an RLF has been detected, the BAP layer of the node starts the recovery process as configured by the CU.

In step T1 it is determined by a node that there is an RLF. This may be determined by the node itself or this may be determined by the node receiving an indication from another node.

In step T2, it is determined if the behaviour of the node in the event of RLF has been configured. The node may have a default behaviour which can be used where the behaviour has not been configured.

earlier node may have forwarded the RLF as configured, but the receiving node is not able to recover from that. Then, the failure is signalled back upstream and an attempt is made to regain connectivity.

In step T8, upon reception of the failed indication, the parent node(s) no longer follow the rules of the IAB donor DU but tries to establish new routes to all possible nodes. If this is successful, then the next step is step T6. Otherwise the next step is step T9.

In step T9, on failure, the node sends an RLF recovery failed indication to its parent.

Alternatively, the node first experiencing RLF, contains a recovery timer and upon expiration of the timer, the node first tries a handover to all discovered nodes and then sends an RLF recovery failed indication to its client. This serves as a backup if the configured handovers cannot be established. This may be an alternative method to solve the problem of misconfiguration. Instead of signalling the RLF to the upstream node, the node first experiencing RLF could use a timer. After the timer is elapsed, the node starts a second recovery with all RLF configurations disabled.

In some embodiments, the configuration process after a RLF and the resulting network is more stable and performs as required.

In some embodiments, it may be configurable that at least one of the following options shall be applied after RLF:

a. No action (No (C)HO, no RLF recovery)

b. Allow (C)HO (CHO may be configured separately (via RRC))

c. Allow RLF Recovery

A method of some embodiments will now be described with reference to FIG. 9. The method may be performed by an apparatus. The apparatus may be provided in an IAB node or be an IAB node. The apparatus may be as shown for example in FIG. 2.

The method comprises in A1 determining for one or more integrated access and backhaul nodes one or more respective actions to be taken by that integrated access and backhaul node in response to a radio link failure in a network of integrated access and backhaul nodes, said determining being dependent on one or more of: loading associated with one or more integrated access and backhaul nodes; and a status of one or more links between two or more of the integrated access and backhaul nodes.

Figure 10:
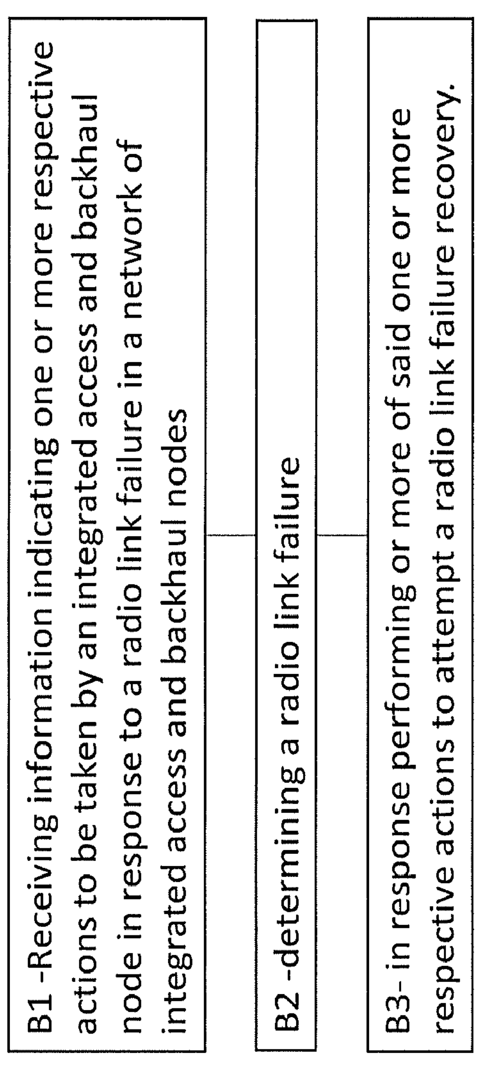
FIG. 10 shows another method of some embodiments.

A method of some embodiments will now be described with reference to FIG. 10. The method may be performed by an apparatus. The apparatus may be provided in an IAB node or be an IAB node. The apparatus may be as shown for example in FIG. 2.

The method comprises in B1 receiving information indicating one or more respective actions to be taken by an integrated access and backhaul node in response to a radio link failure in a network of integrated access and backhaul nodes.

The method comprises in B2 determining a radio link failure.

The method comprises in B3, responsive to determining a radio link failure, performing one or more of said one or more respective actions to attempt a radio link failure recovery. Although the apparatuses have been described as one entity, different modules and memory may be implemented in one or more physical or logical entities.

It is noted that whilst some embodiments have been described in relation to 5G networks, similar principles can be applied in relation to other networks and communication systems. Therefore, although certain embodiments were described above by way of example with reference to certain example architectures for wireless networks, technologies and standards, embodiments may be applied to any other suitable forms of communication systems than those illustrated and described herein.

Some embodiments may be implemented by circuitry. The term "circuitry" may refer to one or more or all of the following:

(a) hardware-only circuit implementations (such as implementations in only analog and/or digital circuitry);

(b) combinations of hardware circuits and software, such as (as applicable):

(i) a combination of analog and/or digital hardware circuit (s) with software/firmware; and (ii) any portions of hardware processor(s) with software (including digital signal processor(s)), software, and memory(ies) that work together to cause an apparatus, such as a mobile phone or server, to perform various functions), and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example, an integrated circuit or chiplet.

The embodiments of this disclosure may be implemented by computer software executable by a data processor, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD or any other suitable physical media. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples. Embodiments of the disclosure may be practiced in various components such as integrated circuit modules.

The scope of protection sought for various embodiments of the disclosure is set out by the independent claims. The embodiments and features, if any, described in this specification that do not fall under the scope of the independent claims are to be interpreted as examples useful for understanding various embodiments of the disclosure.

The foregoing description has provided by way of non-limiting examples a full and informative description of the exemplary embodiment of this disclosure. However, various modifications and adaptations may become apparent to those skilled in the relevant arts in view of the foregoing description, when read in conjunction with the accompanying drawings and the appended claims. However, all such and similar modifications of the teachings of this disclosure will still fall within the scope of this invention as defined in the appended claims. Indeed, there is a further embodiment comprising a combination of one or more embodiments with any of the other embodiments previously discussed.

The invention claimed is:

1. An apparatus comprising at least one processor and at least one memory including a computer program code, the at least one memory and computer program code configured to, with the at least one processor, cause the apparatus at least to:

determine for one or more integrated access and backhaul nodes one or more respective actions to be taken by that integrated access and backhaul node in response to a radio link failure in a network of integrated access and backhaul nodes, said determining being dependent on one or more of:

loading associated with one or more integrated access and backhaul nodes; and a status of one or more links between two or more of the integrated access and backhaul nodes, wherein the respective actions comprise:

waiting for a radio link failure to end and attempting to re-establish a link to an original to integrated access and backhaul node; and without trying to do a handover before, sending a failure indication to a child integrated access and backhaul node.

2. The apparatus of claim 1, wherein:

a parent integrated access and backhaul node is configured to react to a radio link failure by passing the failure indication as a backhaul radio link failure indication to the child integrated access and backhaul node without prior checking of possible links to other nodes; and the child integrated access and backhaul node is configured to react to the backhaul radio link failure indication by performing a conditional handover to a target integrated access and backhaul node, whereby a subtree of the parent integrated access and backhaul node is moved as a whole to the target integrated access and backhaul node.

3. The apparatus of claim 1, wherein each link is an established link or a link which is establishable during a handover, and the apparatus is further caused to determine the one or more actions based on one or more load related criteria, wherein the one or more load related criteria comprise a load balancing criterion.

4. The apparatus of claim 3, wherein the one or more load related criteria comprise a load forecast for determining whether an overload situation would occur after a radio link failure recovery.

5. The apparatus of claim 1, further caused to:

collect information from two or more of the integrated access and backhaul nodes about one or more of:

the loading associated with one or more integrated access and backhaul nodes; and the one or more links between two or more of the integrated access and backhaul nodes, wherein the apparatus is further caused to meter load for the integrated access and backhaul nodes and to map the metered load onto the one or more links between the integrated access and backhaul nodes, and wherein the information about the one or more respective actions is transmitted to the respective integrated access and backhaul node via at least one of: a radio resource control protocol, an operation and maintenance protocol, or an F1 application protocol.

6. The apparatus of claim 5, wherein the information about the one or more respective actions is transmitted using an F1 application protocol message comprising an RLF-behavior information element, the RLF-behavior information element comprising: a conditional handover sub-element with a first gNB-DU UE F1AP identifier, a handover sub-element with a second gNB-DU UE F1AP identifier, and a forward radio link failure sub-element.

7. The apparatus of claim 1, further caused to:

cause information about the one or more respective actions to be taken by a respective integrated access and backhaul node in response to a radio link failure to be transmitted to the respective integrated access and backhaul node; and perform the determining of the one or more actions, prior to an occurrence of a radio link failure.

8. The apparatus of claim 7, wherein the apparatus is provided in a distributed unit of an integrated access and backhaul donor node, and wherein the information about the one or more respective actions is communicated via a central unit of the integrated access and backhaul donor node.

9. The apparatus of claim 1, wherein the apparatus is provided in a central unit of an integrated access and backhaul donor node, and wherein the apparatus is further caused to repeat the determining of the one or more actions at given time intervals.

10. The apparatus of claim 9, wherein the one or more respective actions are determined based on a scope of affected nodes, the scope comprising one of: all nodes, a child node only, or an entire subtree.

11. An apparatus comprising at least one processor and at least one memory including a computer program code, the at least one memory and computer program code configured to, with the at least one processor, cause the apparatus at least to:

receive information indicating one or more respective actions to be taken by an integrated access and backhaul node in response to a radio link failure in a network of integrated access and backhaul nodes;

determine a radio link failure; and in response perform one or more of said one or more respective actions to attempt a radio link failure recovery, wherein the respective actions comprise:

waiting for a radio link failure to end and attempting to re-establish a link to an original to integrated access and backhaul node; and without trying to do a handover before, sending a failure indication to a child integrated access and backhaul node.

12. The apparatus of claim 11, wherein the respective actions further comprises:

attempting to establish a new connection to any reachable integrated access and backhaul node; and attempting handover to an ordered list of integrated access and backhaul nodes.

13. The apparatus of claim 12, wherein the apparatus is further caused to:

determine a type 2 radio link failure indicating that a parent node is in a radio link failure status and is trying to recover, and in response allow child nodes to recover before recovery at the parent node has failed; and upon failure of all handover attempts to the ordered list of integrated access and backhaul nodes, send a backhaul radio link failure indication to child nodes.

14. The apparatus of claim 11, further caused to:

determine that a radio link failure recovery has failed and in response to send an indication to a parent integrated access and backhaul node; and determine a radio link failure responsive to information received from another node.

15. The apparatus of claim 14, further caused to:

determine that a radio link failure recovery has failed within a given time period and in response to attempt a different radio link failure recovery to that provided by the one or more actions, wherein the given time period is defined by a recovery timer, wherein upon expiration of the recovery timer, the apparatus is further caused to attempt a handover to all discovered integrated access and backhaul nodes with all radio link failure configurations disabled, and wherein upon receiving a radio link failure recovery failure indication from a child integrated access and backhaul node, the apparatus is further caused to no longer follow rules of an integrated access and backhaul donor node and attempt to establish new routes to all possible integrated access and backhaul nodes.

16. The apparatus of claim 11, wherein the information indicating the one or more respective actions is stored in a backhaul adaptation protocol layer in entries connecting a distributed unit and a mobile termination of the integrated access and backhaul node, and wherein the one or more respective actions are performed in a user plane.

17. The apparatus of claim 16, wherein the one or more respective actions include configurable options comprising: no action comprising no conditional handover and no radio link failure recovery; allowing conditional handover, wherein the conditional handover is configured separately via a radio resource control protocol; and allowing radio link failure recovery.

18. The apparatus of claim 17, further caused to:

determine whether a behavior in the event of a radio link failure has been configured, and in response to the behavior not having been configured, follow a default radio link failure recovery behavior.

19. A method comprising:

determining, by an integrated access and backhaul node, for one or more integrated access and backhaul nodes one or more respective actions to be taken by that integrated access and backhaul node in response to a radio link failure in a network of integrated access and backhaul nodes, said determining being dependent on one or more of:

loading associated with one or more integrated access and backhaul nodes; and a status of one or more links between two or more of the integrated access and backhaul nodes, wherein the respective actions comprise:

waiting for a radio link failure to end and attempting to re-establish a link to an original to integrated access and backhaul node; and without trying to do a handover before, sending a failure indication to a child integrated access and backhaul node.

20. The method of claim 19, comprising:

collecting information from two or more of the integrated access and backhaul nodes about one or more of:

the loading associated with one or more integrated access and backhaul nodes; and the one or more links between two or more of the integrated access and backhaul nodes, causing information about the one or more respective actions to be taken by a respective integrated access and backhaul node in response to a radio link failure to be transmitted to the respective integrated access and backhaul node; and performing the determining of the one or more actions, prior to an occurrence of a radio link failure.

* * * * *